United States Patent [19]

Nomula et al.

[11] Patent Number: 4,819,799

[45] Date of Patent: Apr. 11, 1989

[54] OPTICAL DISC PACKAGE

[75] Inventors: Ram R. Nomula, Huntsville, Ala.; Robert S. Parish, Minnetonka, Minn.

[73] Assignee: Laservideo, Inc., Chicago, Ill.

[21] Appl. No.: 134,805

[22] Filed: Dec. 18, 1987

[51] Int. Cl.⁴ ............................................. B65D 85/30
[52] U.S. Cl. ................................... 206/310; 206/312; 206/444
[58] Field of Search ............... 206/303, 307, 309, 310, 206/311, 312, 444

[56] References Cited

U.S. PATENT DOCUMENTS

| | | | |
|---|---|---|---|
| 3,107,783 | 10/1963 | Corey et al. | 206/310 |
| 3,109,539 | 11/1963 | Turoff | 206/310 |
| 3,530,981 | 9/1970 | Wienecke, Jr. | 206/310 |
| 3,949,872 | 4/1976 | Paudras | 206/310 |
| 4,176,744 | 12/1979 | Borzak | 206/303 |
| 4,327,831 | 5/1982 | Inaba et al. | 206/310 |
| 4,488,645 | 12/1984 | Yamaguchi | 206/444 |
| 4,499,996 | 2/1985 | Coyle | 206/444 |
| 4,511,034 | 4/1985 | Pan | 206/310 |
| 4,519,500 | 5/1985 | Perchak | 206/312 |
| 4,535,888 | 8/1985 | Nusselder | 206/444 |
| 4,609,105 | 9/1986 | Manes et al. | 206/444 |
| 4,623,062 | 11/1986 | Chase et al. | 206/311 |
| 4,635,792 | 1/1987 | Yamada et al. | 206/310 |

Primary Examiner—William Price
Attorney, Agent, or Firm—Willian Brinks Olds Hofer Gilson & Lione Ltd.

[57] ABSTRACT

A package for an optical disc and an optical disc sleeve includes upper and lower formed plastic sheets sized to receive and support therebetween the optical disc and the optical disc sleeve in side by side relationship. The lower sheet is shaped to support the optical disc and defines an annular depression made up of a central hub, an inner ledge, an annular floor surrounding the inner ledge, an array of raised stiffening structures formed in the annular floor, and at least one outer ledge positioned around the annular floor. The upper sheet is shaped to cover the optical disc and the optical disc sleeve and includes a closed end receptacle shaped to receive an end portion of the hub. The hub has an enlarged head that forms an interference fit with the central opening in the disc to hold the disc on the hub. The upper and lower sheets define peripheral shoulders shaped to fit together to increase the rigidity of the sheets.

15 Claims, 3 Drawing Sheets

U.S. Patent  Apr. 11, 1989  Sheet 1 of 3  4,819,799
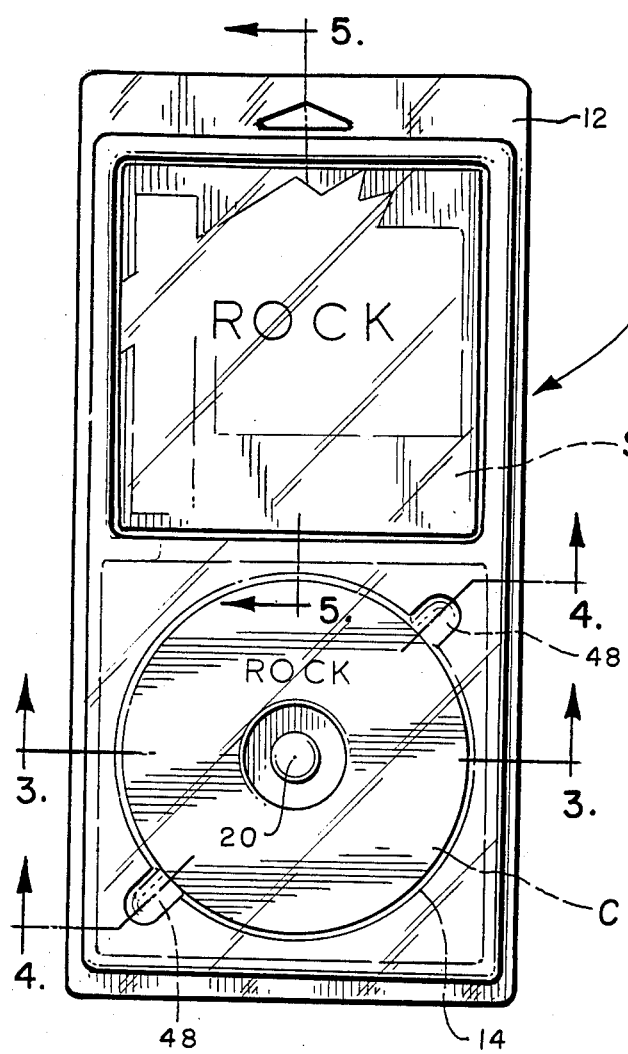
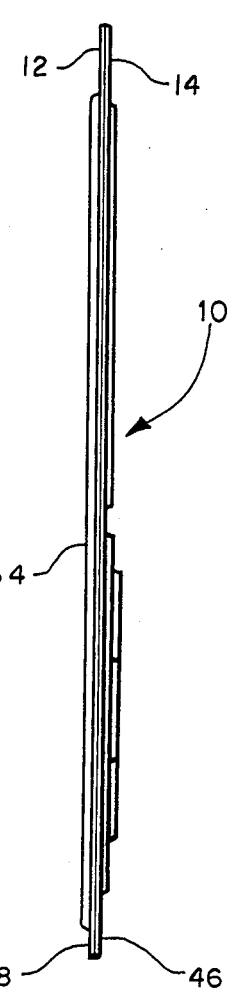
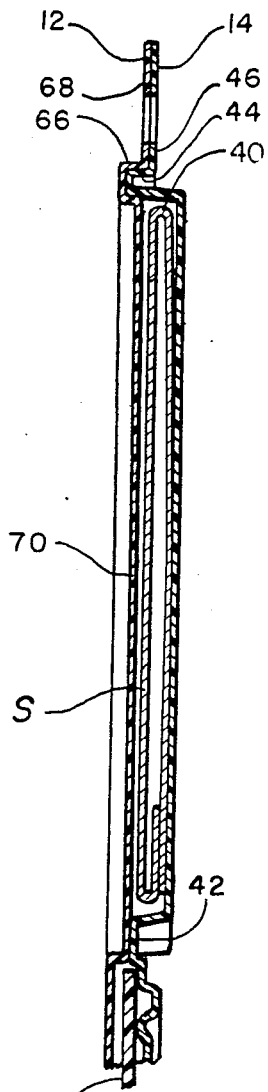
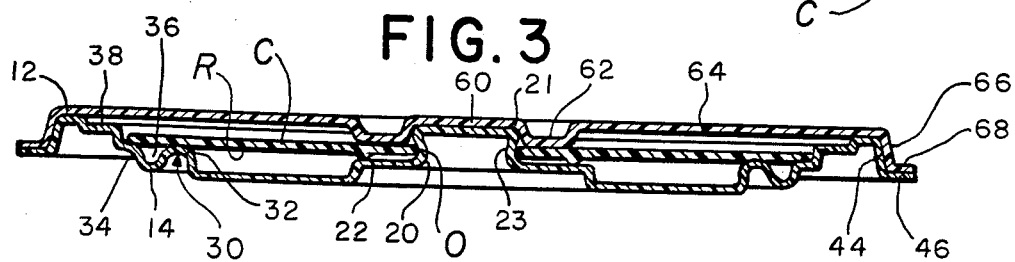
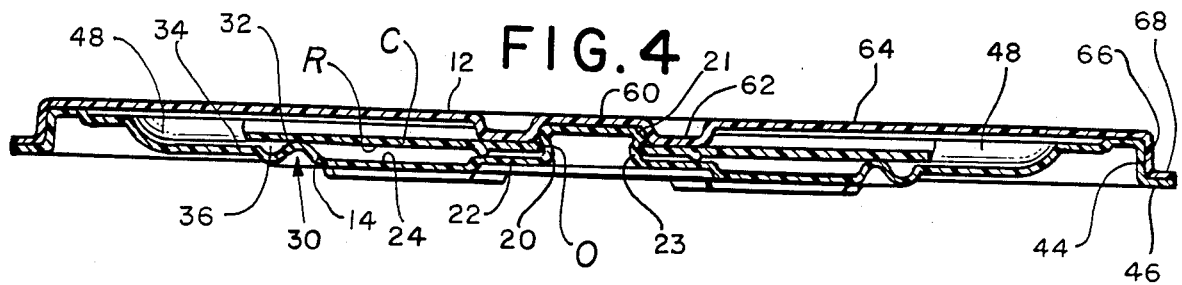

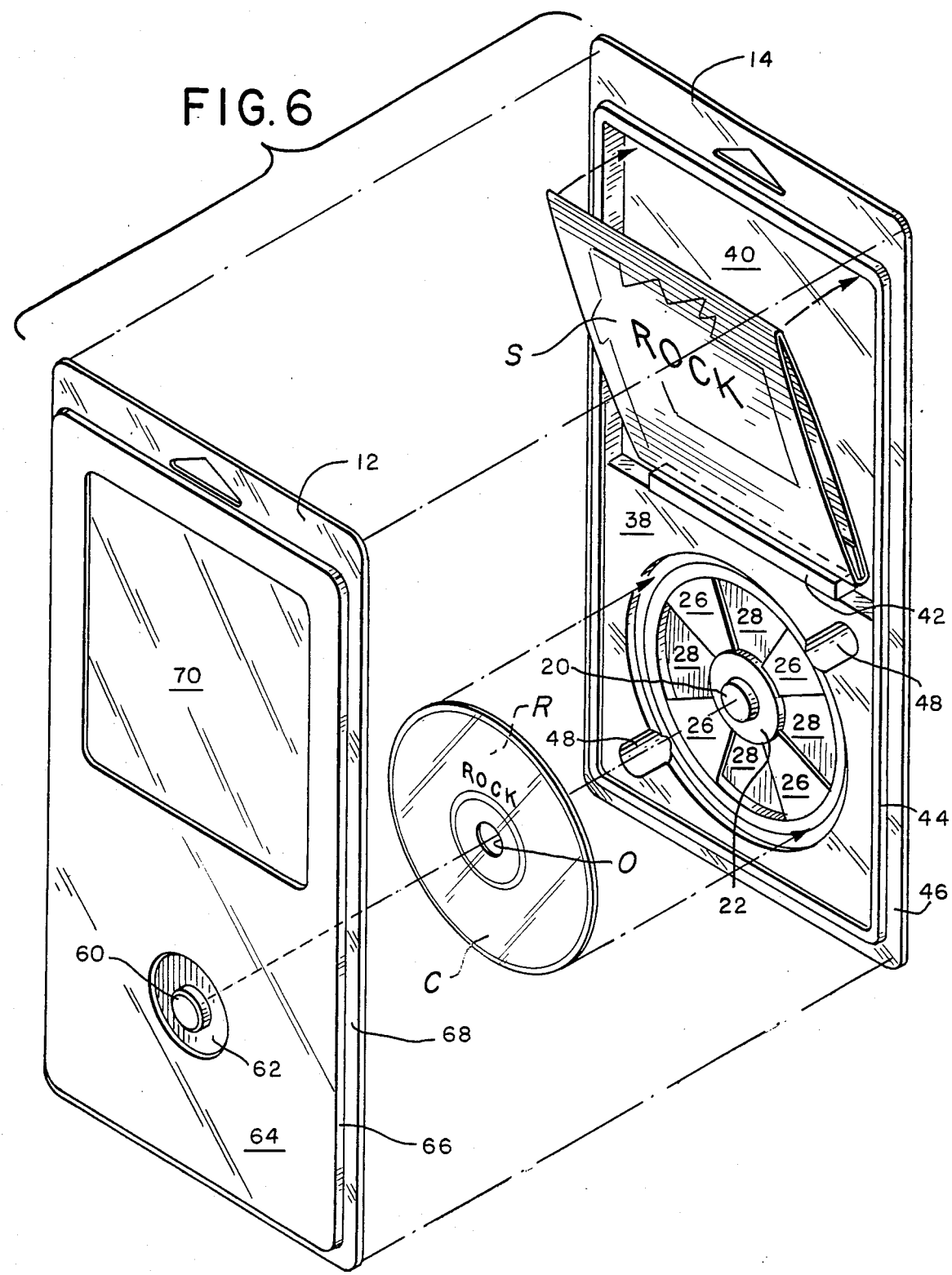

OPTICAL DISC PACKAGE

BACKGROUND OF THE INVENTION

The present invention relates to a low cost package for an optical disc such as a compact disc.

Conventionally, compact discs have been sold in packages which include a so called "jewel case". This jewel case is a rigid, plastic housing which is used to store and protect the compact disc between uses. The jewel case has a generally rectangular outside configuration, and is conventionally packaged for sale between a pair of transparent sheets which are heat bonded together to form a package. This package includes a first region that contains the jewel case (which in turn contains the compact disc) and a second region which contains one or more printed sheets identifying the contents of the compact disc. Nusselder U.S. Pat. No. 4,535,888 shows one such jewel case.

Chase U.S. Pat. No. 4,623,062 discloses an optical disc package in which the package itself is used to store the disc after sale. However, the Chase design requires an additional stiffener to prevent the disc package from being folded and stolen prior to sale.

Such elaborate packaging is well suited for relatively expensive compact discs. However, compact discs such as single play discs are sold at significantly lower prices, ad the relatively expensive packaging described above is not appropriate for many such applications.

The present invention is directed to an improved, low cost package which dispenses with the need for a jewel case or for additional stiffeners, and which is therefore particularly well suited for low cost optical discs such as single play discs.

SUMMARY OF THE INVENTION

According to this invention a package is provided for an optical disc having a central opening and for an optical disc sleeve shaped to enclose the optical disc. This package includes upper and lower formed plastic sheets sized to receive and support therebetween the optical disc and the optical disc sleeve in side-by-side relationship, at least one of the plastic sheets being transparent to allow the optical disc and the optical disc sleeve to be seen through the transparent plastic sheet. One of the sheets comprises a hub having an enlarged end portion which in its relaxed state is larger than the central opening of the optical disc, and a reduced diameter neck portion such that the optical disc can be snapped in place over the end portion and the optical disc, once inserted on the hub, is held on the hub by an interference fit between the enlarged end portion and the optical disc. The lower sheet defines an annular depression shaped to receive the optical disc and the sleeve. The upper sheet is shaped to cover the optical disc and the sleeve, and the upper and lower sheets define peripheral shoulders shaped to fit together to increase the rigidity of the sheet. Preferably both of the plastic sheets are transparent to allow both the sleeve and the disc to be seen through the sheets.

As described in detail below, the preferred embodiment of this invention provides a low cost, rigid package which provides excellent protection to the compact disc, and which prevents the compact disc from disengaging from the hub. All of this is provided without forming openings of any type in either of the sheets, thereby ensuring excellent protection for the disc against contamination.

The invention itself, together with further objects and attendant advantages, will best be understood by reference to the following detailed description, taken in conjunction with the accompanying drawings.

BRIEF DESCRIPTION OF THE DRAWINGS

FIG. 1 is a plan view of an optical disc package which incorporates a presently preferred embodiment of this invention.

FIG. 2 is a side view of the package of FIG. 1.

FIG. 3 is a cross-sectional view taken along line 3—3 of FIG. 1.

FIG. 4 is a cross-sectional view taken along line 4—4 of FIG. 1.

FIG. 5 is a fragmentary cross-sectional view taken line 5—5 of FIG. 1.

FIG. 6 is an exploded perspective view of the package of FIG. 1.

DETAILED DESCRIPTION OF THE PRESENTLY PREFERRED EMBODIMENTS

Figure 7:
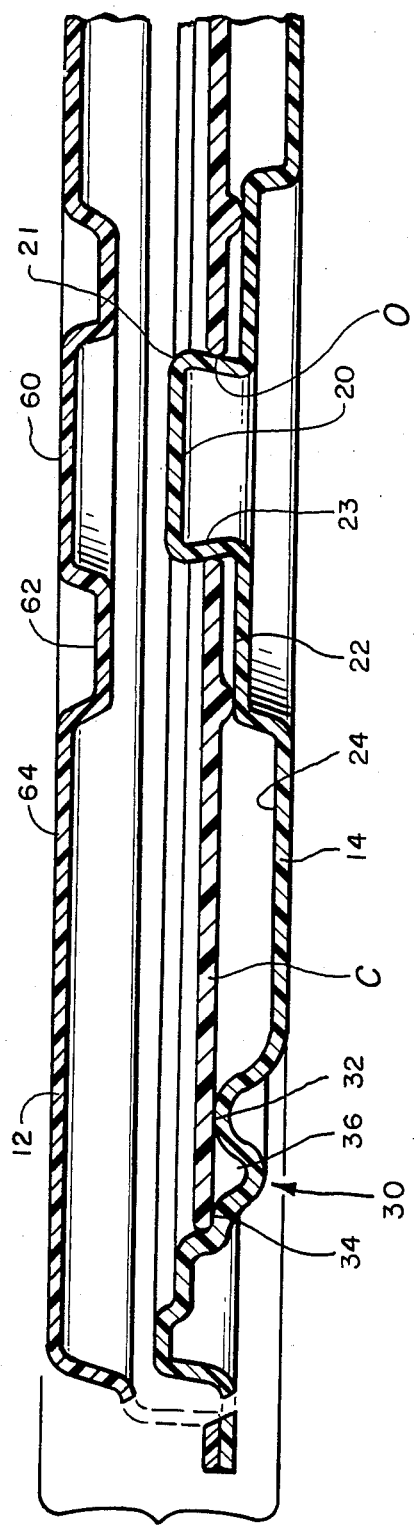
FIGS. 7, 8 and 9 are fragmentary cross-sectional views through the package of FIG. 1 showing an optical disc at various stages of removal from the package.

Turning now to the drawings, FIGS. 1 and 6 show plan and exploded perspective views of a package 10 which incorporates a presently preferred embodiment of this invention. This package 10 is used to protect and display a compact disc C and a compact disc sleeve S. The sleeve S in this embodiment is a paper sleeve closed at one end and sized to receive and contain the compact disc C after the compact disc C has been removed from the package 10. Preferably, the sleeve S is printed with graphical and textual information identifying the compact disc C.

The package 10 of this embodiment is made up of an upper sheet 12 and a lower sheet 14, both of which are preferably formed of uniform thickness in a conventional vacuum forming process from a sheet of a suitable plastic material. This invention is not limited to any particular material; however, transparent polyvinylchloride in a thickness in the range of 10 to 20 thousandths of an inch and most preferably 12.5 thousandths of an inch has been found to be suitable.

Turning now to FIGS. 3, 4 and 6, the lower sheet 14 defines a number of structural features that center the compact disc C in place, provide a rigid structure to support the compact disc C, and interlock the compact disc C with the lower sheet 14.

The features formed in the lower sheet 14 include a central hub 20 which is sized to fit through a central opening 0 in the compact disc C. The hub 20 includes an enlarged head 21 and a reduced diameter neck 23. The head 21 has a rest diameter larger than that of the central opening 0, and snaps onto the optical disc C as described below in conjunction with FIGS. 7-9. The hub 20 is surrounded by an inner ledge 22 which is annular in shape and is dimensioned to avoid the recorded surface R of the compact disc C. This inner ledge 22 defines a support plane for the compact disc C.

The inner ledge 22 is in turn surrounded by a recessed annular floor 24 which is made up of sector shaped first and second areas 26, 28, respectively. As best shown in FIG. 6, the first and second areas 26, 28 are both recessed with respect to the inner ledge 22, and the second areas 28 are recessed by a greater amount with respect to the inner ledge 22 than the first areas 26.

The annular floor 24 is in turn surrounded by an outer ledge 30 which in this embodiment comprises first and second annular surfaces 32, 34 separated by an annular trough 36. Preferably, the uppermost portions of both of the annular surfaces 32, 34 support the compact disc C as shown in FIGS. 3 and 4.

A raised surface 38 is disposed around the second annular surface 34, and the entire region between the raised surface 38 and the hub 20 is in effect a recess sized to receive the compact disc C.

The lower sheet 14 also defines a sleeve receiving region 40 which is recessed with respect to the raised surface 38 and is separated therefrom by a stiffening structure 42 (FIGS. 5 and 6). The perimeter of the lower sheet 14 defines a channel which surrounds the raised surface 38 and the sleeve receiving region 40 and defines an outer shoulder 44. The shoulder 44 is in turn surrounded by a peripheral flange 46. A pair of opposed finger recesses 48 are formed in the raised surface 38 to facilitate removal of the compact disc C from the recess around the raised hub 20.

Turning now to FIGS. 3-6, the upper sheet 12 defines a closed end receptacle 60 which is sized to receive the free end of the hub 20. The receptacle 60 is surrounded by a recessed area 62 positioned to contact a central portion of the compact disc C overlying the inner ledge 22. The recessed area 62 is surrounded by a raised area 64, which is in turn surrounded by a peripheral shoulder 66. The peripheral shoulder 66 is surrounded by a flange 68 positioned to overly the flange 46. The upper sheet 12 also defines a recessed area 70 positioned to overly the compact disc sleeve S.

Preferably, the upper and lower sheets 12, 14 are first vacuum formed as described above. The compact disc C is then snapped in place on the hub 20, the sleeve S is positioned in the sleeve receiving region 40, and then the upper sheet 12 is assembled in place with the receptacle 60 receiving the hub 20. Then the upper sheet 12 is preferably secured to the lower sheet 14 by conventional heat sealing techniques at the flanges 46, 68.

Figure 8:
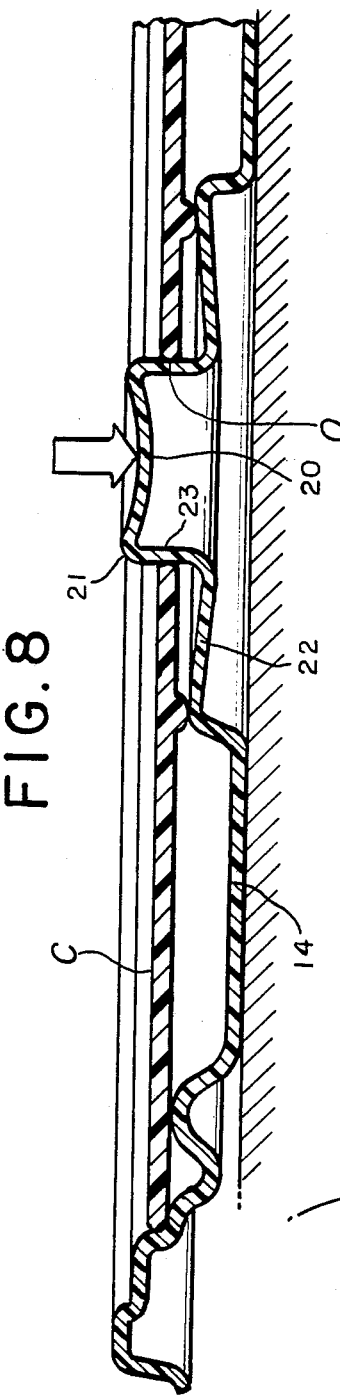
Figure 9:
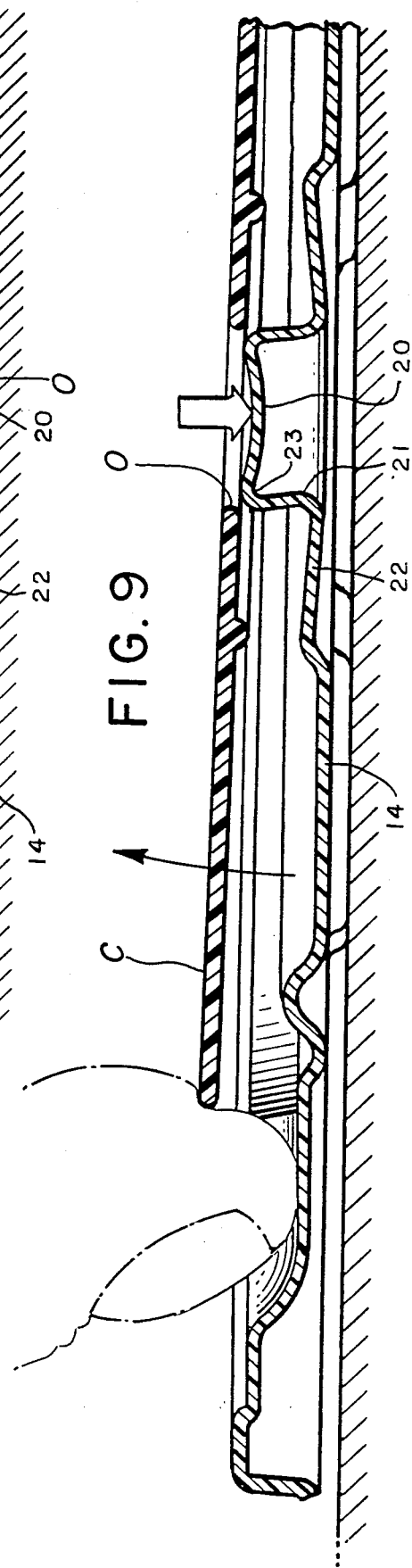

FIGS. 7-9 illustrate the manner in which the hub 20 interlocks with the optical disc C, and the manner in which the optical disc C can be released from the hub 20. FIG. 7 shows a cross-sectional view at an enlarged scale, in which the upper sheet 12 has been lifted from the lower sheet 14 to expose the compact disc C. In its rest state the enlarged head 21 of the hub 20 is larger in diameter than the opening O in the compact disc C. This causes an interference fit which positively locks the compact disc C in position against the inner ledge 22.

After the upper sheet 12 has been removed, the compact disc C is released from the hub 20 by depressing the center of the hub 20 as shown at the arrow in FIG. 8. This causes an elastic deformation of the hub 20 and the inner ledge 22 and reduces the effective diameter of the enlarged head 21 to allow the compact disc C to be removed from the hub 20, as shown in FIG. 9. Once downward pressure is removed from the center of the hub 20, it resumes its original position, ready to receive the compact disc C.

Several of the features described above cooperate to provide a particularly low cost, rigid, and effective package. In particular, the configuration of the hub 20 substantially prevents the compact disc C from disengaging from the hub 20 unless pressure is applied to the hub as shown in FIG. 8. Furthermore, the first and second areas 26, 28, the first and second annular surfaces 32, 34, the shoulders 44, 66, and the stiffening structure 42 all cooperate to stiffen the package and therefore to protect the compact disc C. It is also significant that the first and second areas 26, 28 are both spaced away from the compact disc C, as is the raised area 64. Thus, minor deformation of the upper and lower sheets 12, 14 can occur without corresponding deformation of the compact disc C. Furthermore, both of the upper and lower sheets 12, 14 are free of openings of any sort in the regions inside the shoulders 44 and 66. This reduces any tendency of the upper and lower sheets 12, 14 to tear in use, and it improves the sealing of the package and therefore the protection afforded the compact disc C and the sleeve S.

As yet another advantage, the package 10 allows the sleeve S to be displayed in side by side, non-overlapping relationship with the compact disc C, thereby providing a package of the same general dimensions as the standard jewel case package described above. For this reason, conventional storage and display fixtures can be used for the package 10. Since the sleeve S is typically imprinted with identifying graphical and textual information, there is no need for any additional label or identifying information to be placed on the package 10. This further reduces the overall cost of the package 10.

In the package 10 the hub 20 is formed in the lower sheet 14 while the receptacle 60 is formed in the upper sheet 12. Of course, in an alternate embodiment (not shown) these relationships can be reversed and the hub 20 can be formed on the upper sheet 12. However, the arrangement described in detail above and shown in the drawings provides the advantage that the hub 20 can be used to center the compact disc C in the recess defined by the lower sheet 14.

From the foregoing description it should be apparent that an improved optical disc package has been described which provides excellent protection for the disc at reduced cost. Of course, it should be understood that a wide range of changes and modifications can be made to the preferred embodiment described above. For this reason, it is intended that the foregoing detailed description be regarded as illustrative rather than limiting, and that it be understood that it is the following claims, including all equivalents, which are intended to define the scope of this invention.

We claim:

1. A package for an optical disc having a central opening and for an optical disc sleeve shaped to enclose the optical disc, said package comprising:

upper and lower formed plastic sheets sized to receive and support therebetween the optical disc and the optical disc sleeve in side by side relationship, at least one of the plastic sheets being transparent to allow the optical disc and the optical disc sleeve to be seen through the transparent plastic sheet;

one of said sheets comprising a hub having an enlarged end portion which in its relaxed state is larger than the central opening of the optical disc and a reduced diameter neck portion such that the optical disc can be snapped in place over the end portion and the optical disc, once inserted on the hub, is held on the hub by an interference fit between the enlarged end portion and the optical disc;

said lower sheet defining a depression shaped to receive the optical disc;

said upper sheet shaped to cover the optical disc and the optical disc sleeve;

said upper and lower sheets defining peripheral shoulders shaped to fit together to increase the rigidity of the sheets.

2. The invention of claim 1 wherein the depression comprises:

at least one inner ledge positioned around the hub to support an inner portion of the optical disc on a support plane;

an annular floor surrounding the inner ledge and spaced from the support plane to avoid contact with the optical disc;

an array of raised stiffening structures formed in the annular floor; and at least one outer ledge positioned around the annular floor to support an outer portion of the optical disc.

3. The invention of claim 2 wherein the raised stiffening structures comprise an array of alternating first and second areas, said first areas spaced from the support plane by a first distance and said second areas spaced from the support plane by a second, larger distance to protect the optical disc and to increase the rigidity of the lower sheet.

4. The invention of claim 3 wherein the first and second areas are sector shaped with respect to the hub.

5. The invention of claim 2 wherein the inner ledge is annular, and wherein the outer ledge comprises two annular surfaces separated by an annular trough to increase the rigidity of the lower sheet.

6. The invention of claim 2 wherein the lower sheet additionally defines a pair of finger recesses diametrically disposed with respect to the hub, outwardly adjacent to the outer ledge.

7. The invention of claim 1 wherein the upper and lower sheets are respective vacuum formed plastic sheets.

8. The invention of claim 1 wherein the upper and lower sheets are imperforate to protect the optical disc and the sleeve from contamination.

9. The invention of claim 1 wherein the upper and lower plastic sheets receive the optical disc and the optical disc sleeve in side by side, non-overlapping relationship.

10. The invention of claim 1 wherein the peripheral shoulders extend around the optical disc and the optical disc sleeve to inhibit folding of the sheets.

11. The invention of claim 1 wherein the upper sheet comprises a closed end receptacle shaped to receive the end portion of the hub.

12. A package for an optical disc having a central opening and for an optical disc sleeve shaped to enclose the optical disc, said package comprising:

a lower transparent vacuum formed plastic sheet comprising a sleeve receiving area shaped to receive the sleeve and a disc receiving area sized to receive the disc, said receiving areas positioned in non-overlapping, side by side relationship, said disc receiving area defining an annular depression comprising the following elements integrally vacuum formed in the lower sheet:

a central hub having an enlarged head portion and a narrowed neck portion, said head portion in its relaxed state being larger than the central opening in the optical disc such that the optical disc can be snapped in place over the end portion and the optical disc and the optical disc, once inserted on the hub, is held on the hub by an interference fit between the enlarged end portion and the optical disc;

an annular ledge positioned around the hub to support an inner portion of the optical disc on a support plane;

an annular floor surrounding the inner ledge and spaced from the support plane to avoid contact with the optical disc, said floor defining an array of sector shaped stiffening structures arranged radially with respect to the hub, said stiffening structures comprising alternating first and second areas, said first areas spaced from the support plane by a first distance and said second areas spaced from the support plane by a second larger distance to protect the optical disc and to increase the rigidity of the lower sheet; and at least one outer ledge positioned around the annular floor to support an outer portion of the optical disc;

an upper transparent vacuum formed plastic sheet shaped to cover the optical disc receiving area and the sleeve receiving area and comprising an integral closed end receptacle shaped to receive the end portion of the hub;

said upper and lower sheets defining peripheral interlocking shoulders extending around the sleeve receiving area and the optical disc receiving area to increase to the rigidity of the sheets.

13. The invention of claim 12 wherein the inner ledge is annular, and wherein the outer ledge comprises two annular surfaces separated by an annular trough to increase the rigidity of the lower sheet.

14. The invention of claim 12 wherein the lower sheet additionally defines a pair of finger recesses diametrically disposed with respect to the hub, outwardly adjacent to the outer ledge.

15. The invention of claim 12 wherein the upper and lower sheets are imperforate to protect the optical disc and the sleeve from contamination.

* * * * *

UNITED STATES PATENT AND TRADEMARK OFFICE
CERTIFICATE OF CORRECTION

PATENT NO. : 4,819,799
DATED : April 11, 1989
INVENTOR(S) : Ram Reddy Nomula et al.

It is certified that error appears in the above-identified patent and that said Letters Patent is hereby corrected as shown below:

IN THE BACKGROUND OF THE INVENTION

In column 1, line 29, please delete "ad" and substitute therefor --and--.

IN THE BRIEF DESCRIPTION OF THE DRAWINGS

In column 2, line 18, before "line" please insert --along--.

In column 6, line 14, please delete the second occurrence of "and the optical disc".

Signed and Sealed this

Seventeenth Day of September, 1991

Attest:

HARRY F. MANBECK, JR.

Attesting Officer     Commissioner of Patents and Trademarks